United States Patent [19]

Matsubaguchi et al.

[11] Patent Number: 5,340,647
[45] Date of Patent: Aug. 23, 1994

[54] OPTOMAGNETIC RECORDING MEDIUM

[75] Inventors: Satoshi Matsubaguchi; Takashi Yamada; Ryoichi Yamamoto, all of Kanagawa, Japan

[73] Assignee: Fuji Photo Film Co., Ltd., Kanagawa, Japan

[21] Appl. No.: 938,686

[22] Filed: Sep. 1, 1992

Related U.S. Application Data

[63] Continuation of Ser. No. 430,508, Nov. 1, 1989, abandoned.

[30] Foreign Application Priority Data

Nov. 4, 1988 [JP] Japan .................... 63-278594
May 12, 1989 [JP] Japan .................... 1-119861

[51] Int. Cl.$^5$ .................... B32B 5/16; G11B 11/00
[52] U.S. Cl. .................... 428/336; 428/694 NF; 428/694 RL; 428/694 AH; 428/900; 360/131; 365/122; 369/13
[58] Field of Search ............... 428/694, 900, 457, 336, 428/694 DE, 694 RL, 694 NF, 694 AH; 360/131, 135; 365/122; 369/13, 14

[56] References Cited

U.S. PATENT DOCUMENTS

| | | | |
|---|---|---|---|
| 4,544,443 | 10/1985 | Ohta et al. | 156/643 |
| 4,717,628 | 1/1988 | Takahashi et al. | 428/694 |
| 4,725,502 | 2/1988 | Kiyomiya et al. | 428/694 |
| 4,786,559 | 11/1988 | Murakami et al. | 428/694 |
| 4,871,614 | 10/1989 | Kobayashi | 428/694 |
| 4,902,584 | 2/1990 | Uchiyama et al. | 428/694 |

FOREIGN PATENT DOCUMENTS

| | | |
|---|---|---|
| 296888A2 | 12/1988 | European Pat. Off. . |
| 020933 | 2/1982 | Japan . |
| 48148 | 3/1986 | Japan . |
| 276150 | 12/1986 | Japan . |
| 100636 | 9/1988 | Japan . |
| 644938 | 1/1989 | Japan . |
| 158918 | 4/1989 | Japan . |
| 329248 | 10/1989 | Japan . |
| 334953 | 10/1989 | Japan . |

Primary Examiner—Paul J. Thibodeau
Assistant Examiner—R. Follett
Attorney, Agent, or Firm—Sixbey, Friedman, Leedom & Ferguson

[57] ABSTRACT

An optomagnetic recording medium comprising a substrate plate and, provided thereon, a recording layer and a reflection layer, said reflection layer consisting of a thin layer of an alloy of aluminum and tantalum.

3 Claims, 1 Drawing Sheet

OPTOMAGNETIC RECORDING MEDIUM

This application is a continuation of Ser. No. 07/430,508, filed Nov. 1, 1989, now abandoned.

FIELD OF THE INVENTION

This invention relates to an optomagnetic recording medium, and in particular it relates to an optomagnetic recording medium which has an improved reflection layer and, owing to this, shows improved sensitivity and long-term stability.

BACKGROUND OF THE INVENTION

In recent years, optomagnetic recording media have become widely utilized as large-capacity data files etc. in the form of an optomagnetic disk in which recording and reading can be done by means of a laser light beam.

An optomagnetic recording medium is usually made by forming a recording layer and a protective layer on a transparent substrate plate by means of a film-forming technique such as sputtering. Optomagnetic recording media thus produced are used as they are, i.e., as single recording media, in some cases. In other cases, two single recording media are bonded to each other on the sides thereof remote from the substrate plates through an adhesive layer to give a double-side information-recording medium, which is then used.

In order to effectively utilize an incident light beam during recording and playback operations thereby heightening the C/N ratio and also obtaining recorded bits of well symmetrical shapes, when the light beam is being allowed to enter from the substrate plate side, there has been proposed an optomagnetic recording medium having a reflection layer as the uppermost layer, i.e., the layer farthest from the substrate plate. Such a reflection layer is being employed not only in single optomagnetic recording media but also in double-side information-recording optomagnetic recording media. Such recording media are disclosed, for example, in JP-A-57-120253. (The term "JP-A" as used herein means an "unexamined published Japanese patent application".)

Such a reflection layer generally is a thin layer of a highly reflective metal such as, for example, Al, Au, Cu, Pt, Ta or Ti, or an alloy thereof. Of these, primarily, Al and Cu are being studied because they are cheap and comparatively good in reflectance and heat conduction.

However, Al and Cu have a problem in that they are relatively likely to corrosion, so that their reflectances will be gradually lowered during use or storage.

In attempts to solve the above problem so as to improve the corrosion resistance of reflection layers, there has been proposed a method in which a reflection layer is made from an alloy, and a method in which a reflection layer is surface-treated. However, the corrosion problem has not yet been solved sufficiently. With respect to the method employing an alloy reflection layer, JP-A-62-239349 and JP-A-62-295232, for example, disclose methods in which alloys of Al and a metal such as Mg, Si, Fin, etc. are employed, but these methods are not sufficiently effective. That is, optomagnetic recording media manufactured by these methods are defective in that when they are stored in an environment having a high temperature and a high humidity for an accelerated deterioration test, corrosion spots are developed in the surfaces of the reflection layers in a relatively short period of time and this results in a sporadic decrease in reflectance, thereby causing dropouts (bit error rate (BER)) to increase.

SUMMARY OF THE INVENTION

The present invention has been made in view of the problems accompanying the optomagnetic recording media manufactured by the above-mentioned prior art techniques.

It is, therefore, an object of the present invention to provide an optomagnetic recording medium employing a reflection layer which has improved corrosion resistance and excellent long-term stability.

The foregoing and other objects, features and advantages of the present invention will be apparent from the following detailed description and appended claims taken in connection with the accompanying drawing in which:

DETAILED DESCRIPTION OF THE INVENTION

Figure 1:
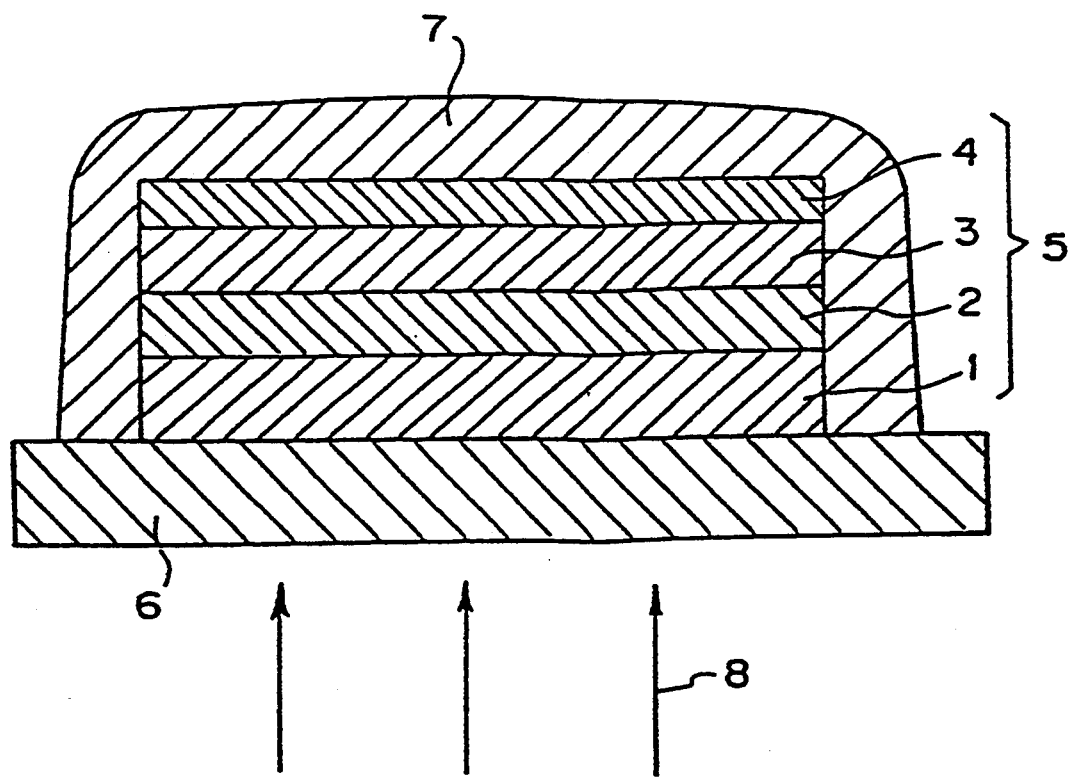
FIG. 1 is a cross-sectional view illustrating the layered structure of an optomagnetic recording medium according to this invention.

The above and other objects are accomplished with an optomagnetic recording medium comprising a substrate plate and, provided thereon, a recording layer and a reflection layer, said reflection layer consisting of a thin layer of an alloy of aluminum (Al) and tantalum (Ta).

One embodiment of the optomagnetic recording medium of the present invention will be described below by way of an example with reference to FIG. 1.

FIG. 1 shows an optomagnetic recording medium comprising a substrate plate 6, which is made from transparent plastic, glass, etc., and provided thereon an optomagnetic recording layer 5 having a layered structure in which a first dielectric protective layer 1, a recording layer 2, a second dielectric protective layer 3 and a reflection layer 4 consisting of an Al-Ta alloy thin layer have been superposed in this order. For the purpose of protecting the whole optomagnetic recording layer 5, the optomagnetic recording medium further comprises an organic protective layer 7 formed from an ultraviolet- curable resin or other resin, in such a manner that the upper surface of the uppermost layer, i.e., the Al-Ta alloy reflection layer 4, and the side surfaces of the optomagnetic recording layer 5 are covered with the organic protective layer. A light beam 8 for recording or reading strikes on the recording medium from the side of the substrate plate 6. The light beam 8 passes through the substrate plate 6 and the first dielectric protective layer 1 and then reaches to the recording layer 2, where the light beam exerts an optomagnetic effect on the recording layer 2. The resulting light beam further traverses the second dielectric protective layer 3, is then reflected by the Al-Ta alloy reflection layer 4, and finally returns to the recording layer 2, where the light beam produces an optomagnetic effect on the recording layer 2. The presence of the Al-Ta alloy reflection layer allows both the so-called Kerr effect (the rotation of the plane of polarization of the reflected light on the surface of the recording layer 2) and the so-called Faraday effect (the rotation of the plane of polarization of the transmitted light) to be exerted on the recording layer, so that the optomagnetic recording medium can show a high C/N ratio.

The construction of one embodiment of the optomagnetic recording medium of this invention was explained above with reference to a single optomagnetic recording medium as an example. However, it is also possible to bond, through an adhesive layer, two single optomagnetic recording media of the above kind to each other on the sides thereof remote from the substrate plates 6, thereby giving a double-side information-recording optomagnetic recording medium.

In addition to the above-described advantage provided by the presence of a reflection layer, the optomagnetic recording medium of this invention has improved anti-corrision properties and does not deteriorating with time, because the reflection layer has improved corrosion resistance.

That is, since the Al-Ta alloy constituting the reflection layer of the optomagnetic recording medium of this invention is per se excellent in corrosion resistance, the reflection layer is not likely to be adversely affected by any oxygen or moisture which has penetrated from the outside and, hence, is not likely to suffer a decrease in reflectance with time, consequently, there is little fear of deterioration in the performance of the optomagnetic recording medium produced according to the present invention. By contrast, in the case of a conventional recording medium with a constitution similar to that shown in FIG. 1, corrision is not avoided, although the surface of the reflection layer 4 is covered with an organic protective layer 7 in order to exclude the atmosphere, the surface of the reflection layer 4 suffers corrosion due partly to the moisture or oxygen which has penetrated thereto through the organic protective layer 7. This results in a decrease in reflectance at the parts thus corroded. Further, the corrosion leads to an increase in BER and to other problems. The above problems become serious if such a conventional recording medium is used or left in an environment having a high temperature and a high humidity.

The aforementioned advantages of the present invention can be made more significant with the so-called double-side information-recording optomagnetic recording medium which comprises two recording media each comprising a substrate plate having on one side a recording layer and a reflection layer, said two recording media being bonded to each other on the sides thereof remote from the substrate plates through a hot-melt adhesive layer.

The conventional double-side information-recording optomagnetic recording media have the following problem. Not only the reflection layers are adversely affected by oxygen and moisture as described above, but also the corrosion of the reflection layers is accelerated by corrosive ions etc., such as low-molecular-weight components and alkali metals, present in the hot-melt adhesive layers. Even if an organic resin protective layer is interposed between the hot-melt adhesive layer and the reflection layer, penetration by these corrosive components cannot be sufficiently prevented in the conventional double-side optomagnetic recording media.

According to the present invention, the corrosion problem can be diminished by using a specific reflection layer which consists of a thin layer of an Al-Ta alloy. The reflection layer thus shows improved corrosion resistance and, therefore, the double-side information-recording optomagnetic recording medium of the invention provides long-term stability.

In the optomagnetic recording medium of this invention, the Al-Ta alloy constituting the reflection layer 4 has a Ta content of preferably from 1 to 10 atomic percent, more preferably from 2 to 8 atomic percent. If the Ta content is too high, the reflectance of the reflection layer is too low while a too small content impairs the corrosion resistance.

The thickness of the Al-Ta alloy reflection layer is preferably from 200 to 1000 Å, more preferably from 200 to 600 Å.

The Al-Ta alloy reflection layer is generally formed by means of a sputtering process. Illustratively stated, RF sputtering or DC sputtering is performed by the use of an Al-Ta alloy target or a target composed of Al with Ta chips placed thereon to form a reflection layer. If a recording medium of the type as shown in FIG. 1 is to be manufactured, the reflection layer is formed on the second dielectric protective layer 3.

Like the above Al-Ta alloy reflection layer 4, the other layers contained in the optomagnetic recording layer 5 may also be formed by means of a sputtering process.

The material for the recording layer 2 in the optomagnetic recording medium of this invention may be a thin layer of a magnetic substance selected from various kinds of oxides and metals. Examples of the recording layer include a thin layer of a crystalline material such as MnBi, MnAlGe or MnCuBi; a thin layer of a single-crystal material such as GdIG, BiSmErGaIG or BiSmYbCoGeIG; and a thin layer of a non-crystalline material such as GdCo, GdFe, TbFe, DyFe, GdFeBi, GdTbFe, GdFeCo, TbFeCo or TbFeNi. Most preferred of these are recording layers consisting mainly of rare earth metals and transition metals, from the viewpoints of sensitivity and C/N ratio. The recording layer may be of a single-layer structure, or may have a multilayer structure in which thin layers consisting of transition metals and thin layers consisting of rare earth metals have been superposed alternately.

In order to improve the corrosion resistance of the recording layer 2 of the optomagnetic recording medium of this invention, a metal such as, for example, Cr, Ti, Pt or Al may be incorporated into either the transition metal thin layer or the rare earth metal thin layer, or into both such layers.

The thickness of the recording layer 2 is generally from 150 to 400 Å.

It is desirable in producing the optomagnetic recording medium of this invention to provide the recording layer 2, on the lower and upper sides thereof, with a first dielectric protective layer 1 and a second dielectric protective layer 3, respectively, to improve the durability and optomagnetic properties of the optomagnetic recording medium. These dielectric protective layers may be made from AlN, SiO, $SiO_2$, $SiN_x$ or SiAlON, but preferred of these are $SiN_x$ and SiAlON. The thickness of each of the dielectric protective layers is generally from 100 to 1,500 Å.

The substrate plate 6 employed in the optomagnetic recording medium of this invention may be made from, for example, a polycarbonate, polymethyl methacrylate, a polyolefin, an epoxy resin or glass. Particularly preferred of these resin substrate plates is a polycarbonate plate.

The organic protective layer 7 for improving the durability of the optomagnetic recording medium may be made from an ultraviolet-curable resin or a hot-melt resin.

Because of the specific composition of the reflection layer, which is a thin layer of an Al-Ta alloy, the optomagnetic recording medium of the present invention is capable of showing a high C/N ratio and is also prevented from suffering deterioration with time. Therefore, the problem of increasing bit error rates (BER) can be diminished by the present invention.

The above-described novel effects brought about by the present invention will be demonstrated by means of the following Examples, which should not be intended to limit the scope of the present invention.

EXAMPLE 1

A single optomagnetic recording medium was made by forming the thin layers as specified below on a polycarbonate substrate plate having a diameter of 130 mm and a thickness of 1.2 mm by means of a continuous sputtering apparatus, as follows. First, a thin layer of $Si_3N_4$ was formed to a thickness of 1,000 Å to give a first dielectric protective layer. Subsequently, a recording layer, which was a thin layer consisting of a noncrystalline TbFeCoCr alloy, was formed on the first dielectric protective layer to a thickness of 300 Å. On this recording layer was formed a thin layer of $Si_3N_4$, as a second dielectric protective layer, to a thickness of 500 Å. Furthermore, on the second dielectric protective layer, a thin layer of an alloy of Al and Ta was formed to a thickness of 300 Å as an Al-Ta alloy reflection layer.

The formation of the above Al-Ta alloy reflection layer was accomplished by using an Al target having a purity of 99.99% and a diameter of 8 inches, with 5 mm-square Ta chips placed on the target. The Ta content in the Al-Ta alloy reflection layer was varied from 1 to 20 atomic percent by changing the number of Ta chips placed on the Al target. The Ta content in the Al-Ta alloy reflection layer is measured by method of emission spectrochemical analysis (Inductively Coupled Plasma).

The thus-obtained four optomagnetic recording media, samples A, B, C and D, which were different in Ta content in the Al-Ta alloy reflection layer were allowed to stand for 1,500 hours in a thermo-hygrostat regulated to have a temperature as high as 80° C. and a humidity as high as 90% RH.

After the thermo-hygrotreatment, the resulting optomagnetic recording media were evaluated for reflectance and the Hc of the recording layer according to the following methods.

Measurement of Reflectance:

The reflectance of an optomagnetic recording medium sample at the position of 29 mm apart from the center thereof was measured with semiconductor laser light having a wavelength of 830 nm by means of the pickup of an optomagnetic disk tester. Measurement of Hc:

The Hc (coercive force) of the recording layer of a sample was measured by means of a Kerr hysteresis apparatus employing semiconductor laser light of 830 run in wavelength.

The results obtained are shown in Table 1.

COMPARATIVE EXAMPLE 1

An optomagnetic recording medium, sample E, was produced under substantially the same conditions as those in Example 1 except that pure Al was used in place of the Al-Ta alloy as the material for a reflection layer. Sample E was evaluated in the same manner as in Example 1, and the results obtained are shown in Table 1.

TABLE 1

| Sample | Ta content (atomic %) | Reflectance | Hc | Note |
| --- | --- | --- | --- | --- |
| A | 1 | 0.8 | 0.90 | Example |
| B | 5 | 0.95 | 0.95 | Example |
| C | 10 | 1.0 | 1.0 | Example |
| D | 20 | 1.0 | 1.0 | Example |
| E | 0 | 0.3 | 0.4 | Comparison |

In Table 1, the reflectance and Hc are both shown in terms of relative values based on the initial values as measured before the samples were placed in the high-temperature and high-humidity ambience.

EXAMPLE 2

A single optomagnetic recording medium was produced by forming the thin layers as specified below on one side of a polycarbonate substrate plate having a diameter of 130 mm and a thickness of 1.2 mm by means of a continuous sputtering apparatus, as follows. First, a thin layer of $SiN_x$ was formed to a thickness of 1,000 Å to give a first dielectric protective layer. Subsequently, a recording layer which was a thin layer consisting of a non- crystalline TbFeCoCr alloy was formed on the first dielectric protective layer to a thickness of 300 Å. On this recording layer was formed a thin layer of $SiN_x$, as a second dielectric protective layer, to a thickness of 500 Å. Furthermore, on the second dielectric protective layer, a thin layer of an alloy of Al and Ta was formed to a thickness of 350 Å as a reflection layer, thereby producing single-side information-recording optomagnetic recording media, samples F and G which differed in Ta content.

The formation of the above Al-Ta alloy reflection layers was accomplished by using an Al target having a purity of 99.99% and a diameter of 8 inches, with 5 mm-square Ta chips placed on the target.

Two of the single-side information-recording optomagnetic recording medium samples as obtained above were secured to each other on the reflection layer sides thereof, i.e., on the sides remote from the polycarbonate substrate plates, by clipping the two recording media with clips at eight positions on the edge of the superposed two recording media. Thus, double-side information-recording optomagnetic recording medium samples were produced from two sample F's and from two sample G's, respectively.

The thus-obtained double-side information-recording optomagnetic recording medium composed of two sample F's secured to each other was designated as sample H, while that composed of two sample G's secured to each other was designated as sample I.

EXAMPLE 3

Two of the sample G's as obtained in Example 2 were coated on the reflection layer sides with an ultraviolet-curable resin, #SD-17 manufactured by Dainippon Ink & Chemicals, Incorporated, Japan, at a thickness of 4 μm, and then the applied resin was cured by means of ultraviolet irradiation. Thereafter, the resulting two samples were bonded to each other on the sides thereof remote from the polycarbonate substrate plates by the use of a hot-melt adhesive, #XW-13 manufactured by Toagosei Chemical Industry Co., Ltd., Japan, thereby producing a double-side information-recording optomagnetic recording medium, sample J.

The thickness of the resulting hot-melt adhesive layer was 20 μm.

COMPARATIVE EXAMPLE 2

Optomagnetic recording medium, sample K was produced under the same conditions as those in Example 2 except that reflection layer consisting of Al with a purity of 99.99% was employed in place of that in sample F. The double-side information optomagnetic recording medium composed of two sample K's secured to each other by clipping under the same conditions as those in Example 2 was designated as sample M. The double-side information optomagnetic recording medium composed of two sample K's bonded to each other by the use of a hot-melt adhesive under the same condition as that in Example 3 was designated as sample P.

The above-obtained optomagnetic recording medium samples F to P were allowed to stand for 1,500 hours in a thermo-hygrostat regulated to have a temperature as high as 80° C. and a humidity as high as 90% RH.

Bit error rate (BER) was measured on each of the samples before and after the samples were placed in the high-temperature and high-humidity ambience. (BER) is defined as the number of erroneous reproduced bits derided by the number of recorded bits.

The BER measurement was made by recording and reproducing signals at 3.7 MHz and 1,800 rpm, while dropout signals were being checked.

Further, the reflectances of the above-obtained optomagnetic recording medium samples at the position of 29 mm apart from the center thereof were measured with semiconductor laser light having a wavelength of 830 nm by means of the pickup of an optomagnetic disk tester.

The results obtained are summarized in Table 2.

TABLE 2

| Sample | Ta contetnt in reflection layer (atomic %) | BER before thermo-hygro-treatment | BER after thermo-hygro-treatment | Reflectance before thermo-hygro-treatment (%) |
| --- | --- | --- | --- | --- |
| F | 2 | $1.8 \times 10^{-6}$ | $2.0 \times 10^{-6}$ | 87.2 |
| G | 5 | $2.1 \times 10^{-6}$ | $2.1 \times 10^{-6}$ | 84.5 |
| H | 2 | $1.9 \times 10^{-6}$ | $3.2 \times 10^{-6}$ | 87.2 |
| I | 5 | $1.6 \times 10^{-6}$ | $2.4 \times 10^{-6}$ | 84.5 |
| J | 5 | $1.9 \times 10^{-6}$ | $2.7 \times 10^{-6}$ | 84.5 |
| K | 0 | $2.8 \times 10^{-6}$ | more than $1.0 \times 10^{-3}$ | 89.0 |
| M | 0 | $3.1 \times 10^{-6}$ | more than $1.0 \times 10^{-3}$ | 89.0 |
| P | 0 | $2.6 \times 10^{-6}$ | more than $1.0 \times 10^{-3}$ | 89.0 |

EXAMPLE 4

Double-side information-recording optomagnetic recording media, samples Q to T, were produced under the same conditions as those in Example 3 except that the Ta contents in the reflection layers were varied as shown in Table 3.

Results of the evaluations of properties are shown in Table 3.

TABLE 3

| Sample | Ta contetnt in reflection layer (atomic %) | BER before thermo-hygro-treatment | BER after thermo-hygro-treatment | Reflectance before thermo-hygro-treatment (%) |
| --- | --- | --- | --- | --- |
| Q | 0.5 | $1.8 \times 10^{-6}$ | $2.2 \times 10^{-6}$ | 88.5 |
| R | 1.0 | $2.1 \times 10^{-6}$ | $2.4 \times 10^{-6}$ | 88.1 |
| S | 10.0 | $1.9 \times 10^{-6}$ | $2.0 \times 10^{-6}$ | 78.2 |
| T | 12.0 | $1.6 \times 10^{-6}$ | $2.1 \times 10^{-6}$ | 74.2 |

While the invention has been described in detail and with reference to specific examples thereof, it will be apparent to one skilled in the art that various changes and modifications can be made therein without departing from the spirit and scope thereof.

What is claimed is:

1. A double-sided information-recording optomagnetic recording medium with improved sensitivity, corrosion resistance and long-term stability under adverse environmental conditions said double-sided medium comprising two single-sided optomagnetic recording media, each said recording medium comprising a plurality of layers, said layers comprising, in order, a substrate layer, a first dielectric protective layer made of a nitride selected from the group consisting of $Si_3N_4$ and SiA-lON; a recording layer comprised of at least one rare earth metal and at least one transition metal, a second dielectric protective layer having substantially the same composition as said first dielectric protective layer, a reflection layer comprised of an alloy of Al and Ta containing 2 to 8 atomic percent Ta, wherein the reflection layer of one single-sided recording medium is bonded to the reflection layer of the other singlesided recording medium so that a layer of a hot melt adhesive is positioned therebetween to form a central layer and each of said substrate layers forms an outermost layer of said double-sided recording medium.

2. A double-sided optomagnetic recording medium with improved sensitivity, corrosion resistance and long-term stability under adverse environmental conditions, said recording medium comprising two single-sided recording media, each formed of a plurality of layers, said layers comprising, in order, a substrate layer, a first dielectric protective layer made of a nitride selected from the group consisting of $Si_3N_4$ and SiA-lON on said substrate layer; a recording layer comprised of at least one rare earth metal and at least one transition metal on said first dielectric protective layer, a second dielectric protective layer having substantially the same composition as said first dielectric protective layer on said recording layer, a reflection layer comprised of an alloy of Al and Ta containing 2 to 8 atomic percent Ta on said second dielectric protective layer, and a protective layer formed from an ultraviolet curable organic resin on said reflection layer, wherein the ultraviolet curable organic resin protective layers of said single-sided recording media are bonded together by a layer of hot melt adhesive.

3. A double-sided information-recording optomagnetic recording medium with improved sensitivity, corrosion resistance and long-term stability under adverse environmental conditions, said double-sided medium comprising two single-sided optomagnetic recording media, each said recording medium comprising a plurality of layers, said layers comprising, in order, a polycarbonate substrate layer, a first dielectric protective layer made of $Si_3N_4$; a recording layer comprised of a non-crystalline TbFeCoCr alloy, a second dielectric protective layer made of $Si_3N_4$ and having a thickness less than that of said first dielectric protective layer, a reflection layer comprised of an alloy of Al and Ta containing 2 to 8 atomic percent Ta and having a thickness of about 350 Å, and an ultraviolet curable resin protection layer 4 um thick, wherein the ultraviolet curable protection layer of one single-sided recording medium is bonded to the ultraviolet curable protection layer of the other single-sided recording medium so that a layer of a hot melt adhesive is positioned therebetween to form a central layer and each of said substrate layers forms an outermost layer of said double-sided recording medium.

* * * * *